United States Patent
Matsuo et al.

(10) Patent No.: US 7,585,809 B2
(45) Date of Patent: *Sep. 8, 2009

(54) PURIFICATION CATALYST FOR EXHAUST GAS, PRODUCTION METHOD THEREFOR, AND PURIFICATION CATALYST EQUIPMENT FOR EXHAUST GAS

(75) Inventors: Yuichi Matsuo, Wako (JP); Norihiko Suzuki, Wako (JP); Kazunori Kiguchi, Wako (JP); Atsushi Furukawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 586 days.

This patent is subject to a terminal disclaimer.

(21) Appl. No.: 10/567,341

(22) PCT Filed: May 27, 2004

(86) PCT No.: PCT/JP2004/007263

§ 371 (c)(1),
(2), (4) Date: Feb. 6, 2006

(87) PCT Pub. No.: WO2005/014166

PCT Pub. Date: Feb. 17, 2005

(65) Prior Publication Data

US 2009/0005241 A1   Jan. 1, 2009

(30) Foreign Application Priority Data

Aug. 6, 2003   (JP) .............................. 2003-287377
Jan. 8, 2004   (JP) .............................. 2004-002667

(51) Int. Cl.
  *B01J 23/10*   (2006.01)
(52) U.S. Cl. ........................ 502/303; 502/302; 502/304; 502/326; 502/327; 502/333; 502/339; 502/355; 502/415; 502/439; 502/525

(58) Field of Classification Search ......... 502/302–304, 502/326, 327, 333, 339, 355, 415, 439, 525
See application file for complete search history.

(56) References Cited

U.S. PATENT DOCUMENTS 4,511,673 A   4/1985   Eto (Continued)

FOREIGN PATENT DOCUMENTS

CN   1042092 A   5/1990

(Continued)

OTHER PUBLICATIONS

Jon Hangas, Observation of Aluminate Whiskers and Nanotubes in Dynamometer-aged Three-way Automotive Catalysts, Catalysis Letters, Apr. 15, 2003, vol. 86, No. 4, pp. 267-272.

(Continued)

*Primary Examiner*—Jerry Lorengo
*Assistant Examiner*—Carlos Barcena
(74) *Attorney, Agent, or Firm*—Arent Fox LLP

(57) ABSTRACT

A purification catalyst for exhaust gas which exhibits satisfactory performance even at a low temperature operation of starting or idling of engine (not more than 400° C.), and a production method therefore are provided.

The catalyst comprises an aluminum oxide supporting Pd, and the aluminum oxide is $LnAlO_3$ (Ln: rare-earth metal).

3 Claims, 3 Drawing Sheets

U.S. PATENT DOCUMENTS

| | | |
|---|---|---|
| 4,921,829 A | 5/1990 | Ozawa et al. |
| 6,060,420 A | 5/2000 | Munakata et al. |
| 2006/0287196 A1 | 12/2006 | Matsuo et al. |

FOREIGN PATENT DOCUMENTS

| | | |
|---|---|---|
| JP | 62-269747 | 11/1987 |
| JP | 63-13729 B2 | 3/1988 |
| JP | 01-168343 A | 7/1989 |
| JP | 03-052642 | 3/1991 |
| JP | 03-068451 A | 3/1991 |
| JP | 05-285387 | 11/1993 |
| JP | 5-86259 | 12/1993 |
| JP | 2003-175337 A | 6/2003 |
| RU | 2006112013/04 | 11/2007 |

OTHER PUBLICATIONS

Lou Xiang-dong et al.; "Preparation Method Review of Provskite-Type Composite Oxide of Lanthanum"; Journal of Zhengzhou Institute of Light Industry (Natural Science); pp. 84-86; No. 4; vol. 15; Dec. 2000.

S. Subramanian, et al. Composition of Pd-La/a-AL203 catalysts Catalysis Letters, 1992, vol. 16, pp. 323 to 334.

PURIFICATION CATALYST FOR EXHAUST GAS, PRODUCTION METHOD THEREFOR, AND PURIFICATION CATALYST EQUIPMENT FOR EXHAUST GAS

TECHNICAL FIELD

The present invention relates to a purification catalyst for exhaust gas, to a production method therefor, and to purification catalyst equipment for exhaust gas, and specifically relates to a production technique of a purification catalyst for exhaust gas in which nitrogen oxides (NOx), carbon hydride (HC), and carbon monoxide (CO) contained in a exhaust gas emitted from an internal combustion engine (for example, in a vehicle) can be simultaneously and effectively reduced, thereby reducing the undesirable components of the exhaust gas.

BACKGROUND ART

For purifying exhaust gas containing, for example, CO, HC, and NO, precious metal elements (Pt, Rh, Pd, and Ir) exhibit a high performance. Therefore, it is preferable to employ the above-mentioned precious metal elements to the purification catalyst for exhaust gas. These precious metals are generally supported by $Al_2O_3$ which is a support having a high surface-to-weight ratio. On the other hand, composite oxides (for example, a perovskite-like oxide) made by combining various elements have extremely varied properties. Therefore, it is preferable for a purification catalyst for exhaust gas to employ the above-mentioned composite oxides. Moreover, when the precious metal is supported by the composite oxides, the properties of the precious metal are significantly changed. From this viewpoint, a preferable performance for purifying exhaust gas can be obtained in the purification catalyst for exhaust gas in which a precious metal is supported by a composite oxide.

Various catalysts mentioned above are now developed, and for example, a technique in which a coalescence rate of the precious metal can be reduced by setting a perovskite-like composite oxide to be a support, judging from deterioration of the precious metal with reduction of active sites by coagulation of the precious metal, is proposed (see the claims of Japanese Unexamined Application Publication No. 5-86259). Moreover, another technique in which reduction of PdO can be reduced by using a perovskite-like composite oxide in which the A site is defective, judging from reducing PdO which is an activated species in a NO reduction reaction, whereby the PdO changes to Pd which is low-active Pd, when the precious metal is Pd, is proposed (see the claims of reacting of Japanese Unexamined Application Publication No. 2003-175337).

Conventional purification catalysts for exhaust gas exhibit sufficient performance for reducing CO, HC, and NOx contained in exhaust gas, in a running of vehicle, particularly during a running at high temperatures (not less than 400° C.). However, the conventional catalysts cannot exhibit sufficient performance for reducing CO, HC, and NOx, in a vehicle at the starting or idling thereof at low temperatures (not more than 400° C.).

As mentioned above, the reason that sufficient performance for purifying the exhaust gas cannot be obtained in the running at low temperature is as follows. That is, in the conventional purification catalyst for exhaust gas, precious metal, for example, Pt, Rh, or Pd, is supported on $Al_2O_3$ having a high surface-to-weight ratio. Due to the high surface-to-weight ratio of the $Al_2O_3$, the precious metal is advantageously supported in a highly dispersed condition. However, $Al_2O_3$ is a stable compound, and does not mutually affect a supported precious metal, whereby activity of the precious metal is not improved. Accordingly, sufficient performance during the running at low temperature cannot be obtained.

Moreover, in the running of a vehicle, it is preferable for Pd to exist in a condition of PdO which is highly reactive. However, even if Pd supported on the $Al_2O_3$ initially exists in a condition of PdO, the Pd is reduced to be a metal condition at high temperatures, whereby the activity is significantly reduced.

DISCLOSURE OF INVENTION

The invention was made in light of the above demands, and it is hence an object thereof to provide a purification catalyst for exhaust gas, in which activity of the precious metal is improved, and the reduction of activity at high temperatures is prevented, whereby sufficient performance even in a vehicle starting up or idling at low temperatures (not more than 400° C.) can be obtained, and a production method therefor, and a purification catalyst equipment for exhaust gas.

The present inventors have intensively researched purification catalysts for exhaust gas, in which sufficient performance, even in a vehicle starting up or idling at low temperatures (not more than 400° C.), can be exhibited. Consequently, it has been learned that a purification catalyst for exhaust gas made by supporting Pd on $LnAlO_3$ (Ln: rare-earth metal) has an effect of suppressing a reduction of PdO to Pd at a high temperature, whereby in the above-mentioned catalyst the high activity can be maintained during the running at low temperatures after running at high temperatures.

The present invention (the first aspect of the invention) was made in light of the above knowledge. That is, a purification catalyst for exhaust gas of the present invention is a catalyst in which Pd is supported on an aluminum oxide, and the oxide is $LnAlO_3$ (Ln: rare-earth metal).

Moreover, the present inventors have also learned that a $LaAlO_3$ among $LnAlO_3$ compounds, is trigonal or rhombohedral, and a B site in the perovskite-like composite oxide is Al in the $LaAlO_3$, whereby dipole moment of the $LaAlO_3$ is large, and an electric fluctuation of PdO bounded on the $LaAlO_3$ is larger than that of PdO which exists independently. Therefore, the oxidation state of Pd in a surface of the PdO supported is a state of $Pd^{2+}$ over a large area. This state is a preferable state for purifying exhaust gas, whereby high activity at low temperatures can be obtained. Additionally, the present inventors have confirmed that this catalyst can exhibit high activity at low temperatures even after exposing the catalyst to operating conditions of about 1000° C.

The present invention (the second aspect of the invention) was made in light of the above knowledge. That is, in the above-mentioned purification catalyst for exhaust gas (the first invention), it is preferable that the aluminum oxide be trigonal or rhombohedral.

Furthermore, the present inventors have also learned that when $LnAlO_3$ is produced, an aqueous nitrate solution of a component containing aqueous carboxylic acid may be evaporated completely to obtain a carboxylic acid complex polymer, whereby $LnAlO_3$ is generated as a single phase, and a surface of the $LnAlO_3$ supporting Pd changes to a configuration in which interaction with PdO is easy.

The present invention (the third and fourth aspects of the inventions) was made in light of the above knowledge. That is, in the above-mentioned purification catalysts for exhaust gas (the first and second aspects of the invention), it is preferable that at least one kind of compound selected from a group of compounds (carboxylic acid having a hydroxyl group or a mercapto group and having a carbon number of 2 to 20, dicarboxylic acid having a carbon number of 2 or 3, and monocarboxylic acid having a carbon number of 1 to 20) be added to aqueous nitrate solution including a component, whereby a purification catalyst for exhaust gas is obtained (the third aspect of the invention). Moreover, in the purification catalysts for exhaust gas (the third aspect of the invention), it is preferable that the aqueous nitrate solution be evaporated completely to obtain a carboxylic acid complex polymer, and that the carboxylic acid complex polymer be heated, whereby a purification catalyst for exhaust gas is obtained (the fourth aspect of the invention).

As the carboxylic acid having a hydroxyl group or a mercapto group and having a carbon number of 2 to 20, oxycarboxylic acid and a compound in which an oxygen atom in the hydroxyl of the oxycarboxylic acid is replaced with a sulfur atom are cited. The carbon number of these carboxylic acids is 2 to 20 in light of solubility in water, is preferably 2 to 12, is more preferably 2 to 8, and is most preferably 2 to 6. Moreover, the carbon number of the monocarboxylic acid is 1 to 20 in light of solubility in water, is preferably 1 to 12, is more preferably 1 to 8, and is most preferably 1 to 6.

Furthermore, as concrete examples of the carboxylic acids having a hydroxyl group or a mercapto group and having a carbon number of 2 to 20, for example, glycolic acid, mercaptosuccinic acid, thioglycolic acid, lactic acid, β-hydroxy propionic acid, malic acid, tartaric acid, citric acid, isocitric acid, allo-citric acid, gluconic acid, glyoxylic acid, glyceric acid, mandelic acid, tropic acid, benzilic acid, and salicylic acid are cited. As concrete examples of the monocarboxylic acids, for example, formic acid, acetic acid, propionic acid, butyric acid, isobutyric acid, valeric acid, isovaleric acid, hexanoic acid, heptanoic acid, 2-methyl hexanoic acid, octanoic acid, 2-ethyl hexanoic acid, nonanoic acid, decanoic acid, and lauric acid are cited. In the above-mentioned acids, it is preferable to use acetic acid, oxalic acid, malonic acid, glycolic acid, lactic acid, malic acid, tartaric acid, glyoxylic acid, citric acid, gluconic acid, and more preferable to use oxalic acid, malonic acid, glycolic acid, lactic acid, malic acid, tartaric acid, glyoxylic acid, citric acid, gluconic acid.

Additionally, the present inventors have particularly researched in detail about a purification catalyst for exhaust gas in which rare-earth metal is applied to an A site of perovskite-like composite oxides. $LnAlO_3$ (Ln: rare-earth metal) is trigonal or rhombohedral. Therefore, the electron state is extremely unstable. Moreover, in these oxides, Al is applied to a B site of perovskite-like composite oxides, whereby a dipole moment exists due to the strong covalent bond between Al and O. Therefore, the dipole moment of $LnAlO_3$ is larger than that of the conventional purification catalyst for exhaust gas, for example $LaFeO_3$. Owing to the properties of $LnAlO_3$, an electric fluctuation of PdO bounded on the $LaAlO_3$ is larger than that of PdO which exists independently, the oxidation state of Pd in a surface of the PdO which is supported is a $Pd^{2+}$ state over a large area. Generally, Pd in the surface of the PdO exists in two states of $Pd^{2+}$ and $Pd^0$ (metal state). In these states, a state of $Pd^{2+}$ has higher activity as a purification catalyst for exhaust gas than a state of $Pd^0$. That is, a purification catalyst for exhaust gas of the present invention, in which Pd is supported on the $LnFeO_3$, has high activity, because most of the Pd on the surface of the PdO exists in a state of $Pd^{2+}$. Moreover, these catalysts can equally maintain the high activity state even after the catalysts are exposed during use to conditions of 1000° C.

The present invention (the fifth aspect of the invention) was made in light of the above knowledge. That is, in the above-mentioned purification catalysts for exhaust gas (the second to fourth aspects of the invention), it is preferable that Pd be supported on the $LnAlO_3$ (Ln: rare-earth metal), and that Pd exist in a state of $Pd^{2+}$ in the surface range that the Pd is supported (the fifth aspect of the invention).

Next, a production method for a purification catalyst for exhaust gas of the present invention (the sixth aspect of the invention) is a method for preferably producing the above-mentioned catalysts (the first to fifth aspects of the invention). That is, the sixth aspect of the invention is a method in which when the purification catalyst for exhaust gas in which Pd is supported on an aluminum oxide, at least one kind of compound selected from a group of compounds (carboxylic acid having a hydroxyl group or a mercapto group and having a carbon number of 2 to 20, a dicarboxylic acid having a carbon number of 2 or 3, and a monocarboxylic acid having a carbon number of 1 to 20) is added to aqueous nitrate solution including a component, whereby a purification catalyst for exhaust gas is obtained.

In the above-mentioned production method for a purification catalyst for exhaust gas (the sixth aspect of the invention), it is preferable that the aqueous nitrate solution be evaporated completely to obtain a carboxylic acid complex polymer, and that the carboxylic acid complex polymer be heated (the seventh aspect of the invention), and it is more preferable that the heating temperature be not more than 1000° C. (the eighth aspect of the invention).

Furthermore, purification catalyst equipment for exhaust gas (the ninth aspect of the invention), produced by using the above-mentioned purification catalysts for exhaust gas (the first to fifth aspects of the invention), is desirable for internal combustion, for example, in a vehicle, particularly because nitrogen oxides (NOx), carbon hydride (HC), and carbon monoxide (CO) contained in an exhaust gas can be simultaneously and effectively reduced by reducing by the equipment.

The purification catalyst for exhaust gas of the present invention in which Pd is supported on $LnAlO_3$ has a function in which the reduction of PdO to Pd metal can be reduced. The shape of Ln (rare-earth metal) variously changes in oxide states. For example, when a catalyst made by supporting Pd on $La_2O_3$ is exposed to high temperature conditions, $La_2O_3$ migrates onto the Pd grain from the contact area between Pd and $La_2O_3$, whereby a shape of filling up $La_2O_3$ with Pd is formed, resulting in additional migration of minute amounts of $La_2O_3$ onto the Pd surface (Zhang et al., J. Phys. Chem., Vol. 100, No. 2, pp. 744-755, 1996). Even in the present system ($LnAlO_3$), Ln and Pd form a complex compound, whereby reduction of PdO to Pd metal can be reduced. Owing to this effect, a purification catalyst for exhaust gas of the present invention can maintain the high activity state while running at low temperatures (not more than 400° C.).

Moreover, in the $LnAlO_3$, for example $LaAlO_3$ (including $Pd/PrAlO_3$ or $Pd/NdAlO_3$) is characterized in that the crystal system is trigonal or rhombohedral. The trigonal or rhombohedral is, as shown in FIG. 1, a crystal system in which an ideal cubic system of a unit lattice is changed in the c-axis direction, and the angle between the a-axis and the b-axis is 120°. That is, the trigonal or rhombohedral is a crystal system in which an ideal cubic system of a perovskite structure is significantly strained. In the crystal system, the electrons state among constituent atoms is extremely unstable. FIG. 2 is a graph showing a XRD spectrum as data to confirm the differences of the crystal systems of the $LaAlO_3$ supporting Pd, etc. That is, when $Pd/LaAlO_3$, $Pd/PrAlO_3$, $Pd/NdAlO_3$, and other perovskite-like composite oxides supporting Pd which is a conventional purification catalyst for exhaust gas (Pd/GdAlO$_3$, Pd/LaCoO$_3$, Pd/LaFeO$_3$, and Pd/LaMnO$_3$) are compared, a difference in strength of the main peak and deviance of position in other peaks are seen in the FIG. 2. Accordingly, judging from the fact that LaAlO$_3$, PrAlO$_3$, or AlO$_3$ is trigonal or rhombohedral, other perovskite-like composite oxides (GdAlO$_3$, LaCoO$_3$, LaFeO$_3$, or LaMnO$_3$) are not trigonal or rhombohedral, but are rhombic. Additionally, in the conventional purification catalyst for exhaust gas, LaNiO$_3$ does not have a difference in strength at a main peak and deviance of position in other peaks against LaAlO$_3$, whereby LaNiO$_3$ is trigonal or rhombohedral.

On the other hand, in the LaAlO$_3$, PrAlO$_3$, and NdAlO$_3$, a B site in the perovskite-like composite oxide is Al, whereby the bond between Al and O has a high degree of probability of being a covalent bond. Therefore, some of the dipole moment is generated in a crystal of perovskite-like composite oxides which has generally a high degree of probability of being an ionic bond. As described above, the perovskite-like composite oxides, that is LaAlO$_3$, PrAlO$_3$, and NdAlO$_3$, are trigonal or rhombohedral, and a B site in the perovskite-like composite oxides is Al in the oxides, whereby dipole moment of the oxides is larger than that of the well-known purification catalyst for exhaust gas, for example LaFeO$_3$.

Due to the dipole moment, an electric fluctuation of PdO bounded on the LaAlO$_3$, PrAlO$_3$, and NdAlO$_3$ is larger than that in which PdO exists independently. Therefore, the oxidation state of Pd in a surface of the PdO supported is a state of Pd$^{2+}$ over a large area. There are two oxidation states of Pd in a surface of the PdO, which are a state of Pd$^{2+}$ and a state of Pd$^0$ (metal state). The state of Pd$^{2+}$ was higher activity than the state of Pd$^0$. That is, in the purification catalysts for exhaust gas of the present invention in which Pd is supported on the LaAlO$_3$, PrAlO$_3$, and NdAlO$_3$, the oxidation state of Pd in a surface of the PdO is the state of Pd$^{2+}$, whereby the catalysts of the present invention have high activity. Moreover, the catalysts of the present invention can exhibit high activity during the running at low temperatures (not more than 400° C.) even after exposing the catalyst to an operating condition of about 1000° C.

Furthermore, when the LaAlO$_3$, PrAlO$_3$, or NdAlO$_3$ is produced, an aqueous nitrate solution of a component containing carboxylic acid is evaporated completely to obtain a carboxylic acid complex polymer, and the polymer is heated at a relatively low temperature of 800° C., whereby LaAlO$_3$, PrAlO$_3$, or NdAlO$_3$ are generated as a single phase. On the other hand, when the LaAlO$_3$, PrAlO$_3$, or NdAlO$_3$ is produced in other ways, for example, solid-phase reaction, LaAlO$_3$, PrAlO$_3$, or NdAlO$_3$ is not generated as a single phase even if the heating at a relatively high temperature of 1700° C. is performed (see Rare Earth Science, Kagaku-Dojin Publishing Company, Inc, Ginya Adachi, p. 564). That is, LaAlO$_3$, PrAlO$_3$, or NdAlO$_3$ of the single phase can be synthesized at the above-mentioned low temperature by using carboxylic acid. Therefore, sufficient surface-to-weight ratio can be obtained, and the catalyst can be used in a state in which the surface of the crystal lattice is active. In the purification catalyst for exhaust gas made by supporting Pd on the LnAlO$_3$ by using the method of the present invention, sufficient surface-to-weight ratio and strong interaction between LnAlO$_3$ and Pd can be obtained, whereby high activity at low temperatures can be realized.

As mentioned above, the LnAlO$_3$(Ln: rare-earth metal) is trigonal or rhombohedral, whereby the electrons state among constituent atoms in LnAlO$_3$ is extremely unstable, and the bond among the Al and the O is a strong covalent bond, whereby some of dipole moment is generated. Therefore, most of Pd supported on these oxides exists in a state of Pd$^{2+}$. In order to confirm this, in the Pd/LaAlO$_3$ which is a representative of the present invention and in the Pd/LaFeO$_3$ and Pd/Al$_2$O$_3$ which is a representative of the conventional technique, states of Pd in a PdO surface were examined by XPS. Generally, a peak position of the metal component (Pd$^0$) of Pd is 335.5±0.3 eV. On the other hand, a peak position of the ion component (Pd$^{2+}$) of Pd is 336.6±0.4 eV. Judging from this fact and the results shown in FIG. 3, in the Pd/LaAlO$_3$, there is a peak at a position which is equivalent to the Pd$^{2+}$, in the Pd/LaFeO$_3$ and Pd/Al$_2$O$_3$, there is a peak at a position which is equivalent to the Pd$^0$. Accordingly, states of Pd in a surface of the LaAlO$_3$ are mostly Pd$^{2+}$. Additionally, the states of Pd in a surface of the LaAlO$_3$ are confirmed as mentioned above, whereby states of Pd in a surface of the other LnAlO$_3$ (Ln: rare-earth metal), for example PrAlO$_3$ and NdAlO$_3$ are similarly estimated.

BEST MODE FOR CARRYING OUT THE INVENTION

Figure 1:
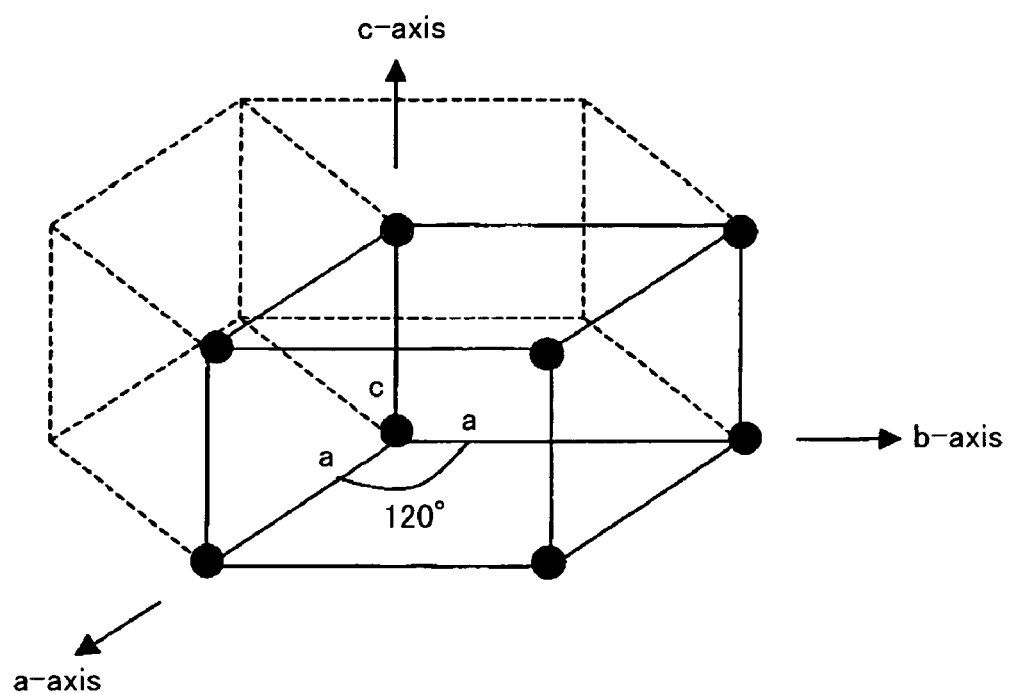
FIG. 1 is a perspective illustration showing a crystal system of LaAlO$_3$ constituting a purification catalyst for exhaust gas of the present invention.

Hereinafter, the present invention will be concretely explained by examples.

PRACTICAL EXAMPLES 1 to 3

[Production of Composite Oxides as Support]

Predetermined amounts of lanthanum nitrate hexahydrate and aluminum nitrate nonahydrate were dissolved in ion-exchanged water, whereby a mixed solution was obtained. Next, a predetermined amount of malic acid was dissolved in ion-exchanged water, whereby an aqueous malic acid solution was obtained. These two solutions were mixed, the obtained mixed solution was set on a hot plate with a stirrer, and the mixed solution was heated to 250° C. and agitated by a stirring bar, whereby evaporation of water into vapor was performed, complete evaporation was performed, and the dried sample was crushed into powder by mortar and pestle. The crushed sample was moved to an aluminum crucible, the sample was heated to 350° C. at a rate of 2.5° C./min in a muffle kiln, and a heat treatment was performed at 350° C. for 3 hours. Owing to the heat treatment, a provisional heated substance in which malate and nitrate-nitrogen (nitrate salt and nitrate ion) were removed was obtained. After crushing the provisional heated substance into powder and mixing for 15 minutes by a mortar and pestle, the obtained mixture was set in the aluminum crucible again, the sample was heated to 800° C. at a rate of 5° C./min in the muffle kiln, and a heat treatment was performed at 800° C. for 10 hours. Owing to the heat treatment, a perovskite-like composite oxide of which the composition was LaAlO$_3$ was obtained. Moreover, perovskite-like composite oxides of which compositions are $PrAlO_3$ and $NdAlO_3$ were similarly obtained.

[Supporting of Precious Metal]

Next, a predetermined amount of palladium nitrate dehydrate was dissolved in ion-exchanged water, whereby an aqueous palladium nitrate solution was obtained. The palladium nitrate and a predetermined amount of $LaAlO_3$, $PrAlO_3$, or $NdAlO_3$ which was in powder form were set in a flask which was like an eggplant, and the sample was completely dried in a hot water bath at 60° C. while decreasing pressure in the flask by a rotary evaporator. After that, the sample was heated to 250° C. at a rate of 2.5° C./min in a muffle kiln, was heated to 750° C. at a rate of 5° C./min, and was held at 750° C. for 3 hours. Due to these treatments, catalyst powders of the Practical Examples 1 to 3, of which the compositions were $Pd/LaAlO_3$, $Pd/PrAlO_3$, and $Pd/NdAlO_3$, in which PdO was impregnated and supported on the perovskite-like composite oxides, were obtained. Surface-to-weight ratios for these catalyst powders are shown in Table 1.

temperature at which CO, HC, and NO are reduced by 50% in a temperature increase test of catalysts after the endurance running.

TABLE 2

| | | Temperature for 50% Reduction (° C.) | | |
|---|---|---|---|---|
| Sample No. | Composition | CO | HC | NO |
| Practical Example 1 | Pd/LaAlO₃ | 254 | 260 | 197 |
| Practical Example 2 | Pd/PrAlO₃ | 251 | 256 | 201 |
| Practical Example 3 | Pd/NdAlO₃ | 258 | 264 | 201 |
| Comparative Example 1 | Pd/Al₂O₃ | 288 | 295 | 302 |
| Comparative Example 2 | Pd/GdAlO₃ | 273 | 280 | 213 |
| Comparative Example 3 | Pd/LaNiO₃ | 299 | 315 | 217 |
| Comparative Example 4 | Pd/LaMnO₃ | 281 | 299 | 204 |
| Comparative Example 5 | Pd/LaCoO₃ | 305 | 320 | 233 |
| Comparative Example 6 | Pd/LaFeO₃ | 300 | 305 | 241 |
| Comparative Example 7 | Pd/LaAlO₃ | 292 | 301 | 235 |

TABLE 3

| | | Endurance Running | Temperature for 50% Reduction (° C.) | | |
|---|---|---|---|---|---|
| Sample No. | Composition | Temperature(° C.) | CO | HC | NO |
| Practical Example 1 | Pd/LaAlO₃ | 900 | 317 | 324 | 260 |
| Practical Example 2 | Pd/PrAlO₃ | 900 | 312 | 323 | 263 |
| Practical Example 3 | Pd/NdAlO₃ | 900 | 318 | 332 | 279 |
| Comparative Example 1 | Pd/Al₂O₃ | 900 | 326 | 335 | >400 |
| Comparative Example 2 | Pd/GdAlO₃ | 800 | 339 | 355 | >400 |
| Comparative Example 3 | Pd/LaNiO₃ | 800 | 328 | 352 | 354 |
| Comparative Example 4 | Pd/LaMnO₃ | 800 | 309 | 320 | 321 |
| Comparative Example 5 | Pd/LaCoO₃ | 900 | 329 | 354 | 278 |
| Comparative Example 6 | Pd/LaFeO₃ | 900 | 365 | 363 | >400 |
| Comparative Example 7 | Pd/LaAlO₃ | 900 | 332 | 361 | 295 |

TABLE 1

| Sample No. | Composition | Surface-to-Weight Ratio (m²/g) |
|---|---|---|
| Practical Example 1 | Pd/LaAlO₃ | 9 |
| Practical Example 2 | Pd/PrAlO₃ | 8 |
| Practical Example 3 | Pd/NdAlO₃ | 8 |
| Comparative Example 1 | Pd/Al₂O₃ | 80 |
| Comparative Example 2 | Pd/GdAlO₃ | 9 |
| Comparative Example 3 | Pd/LaNiO₃ | 5 |
| Comparative Example 4 | Pd/LaMnO₃ | 15 |
| Comparative Example 5 | Pd/LaCoO₃ | 4 |
| Comparative Example 6 | Pd/LaFeO₃ | 5 |
| Comparative Example 7 | Pd/LaAlO₃ | 1 |

[Estimation of Activity]

Figure 2:
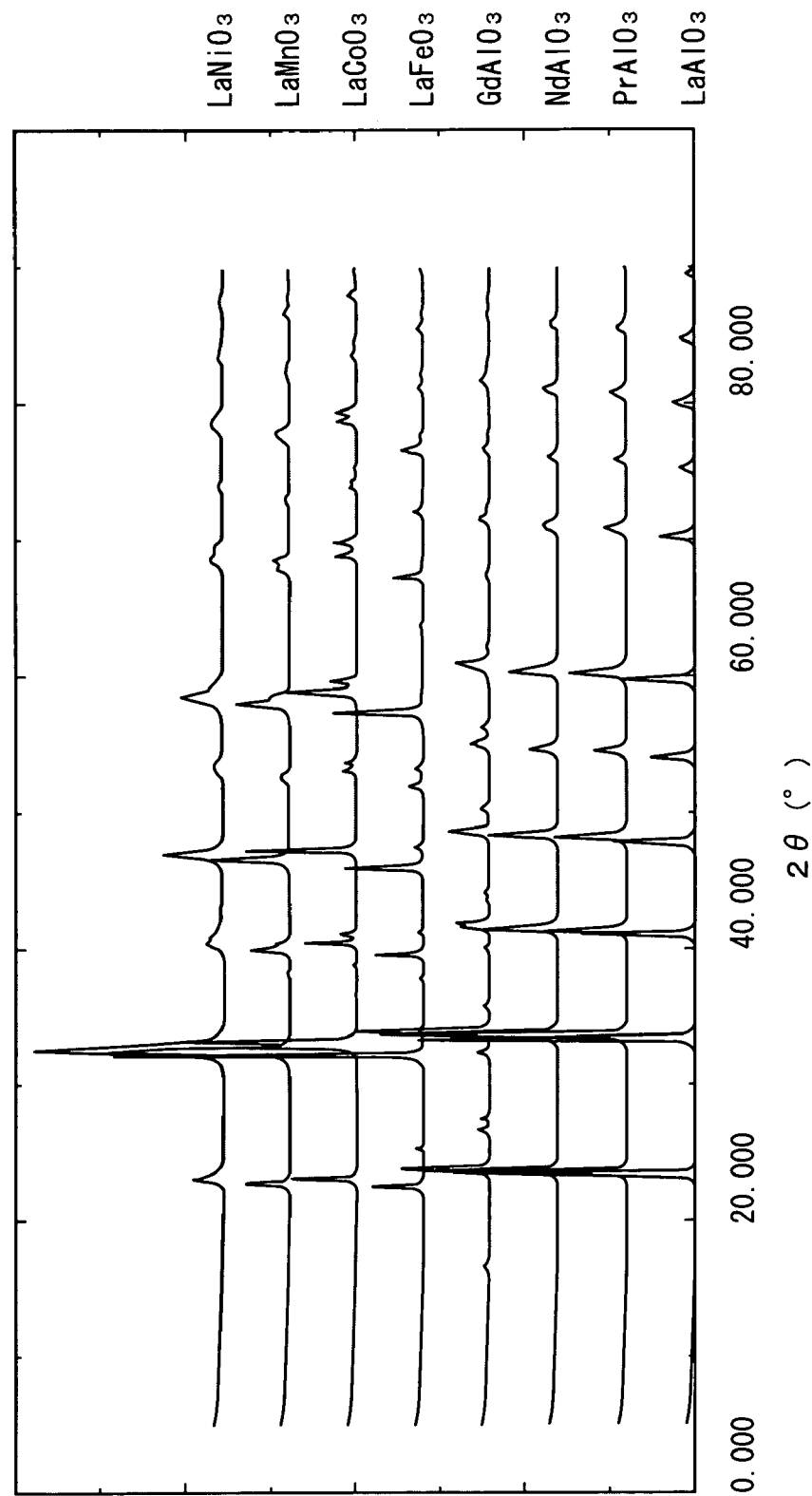
FIG. 2 is a graph showing a XRD spectrum as data to confirm the differences of the crystal systems of the LaAlO$_3$ supporting Pd, etc.
Figure 3:
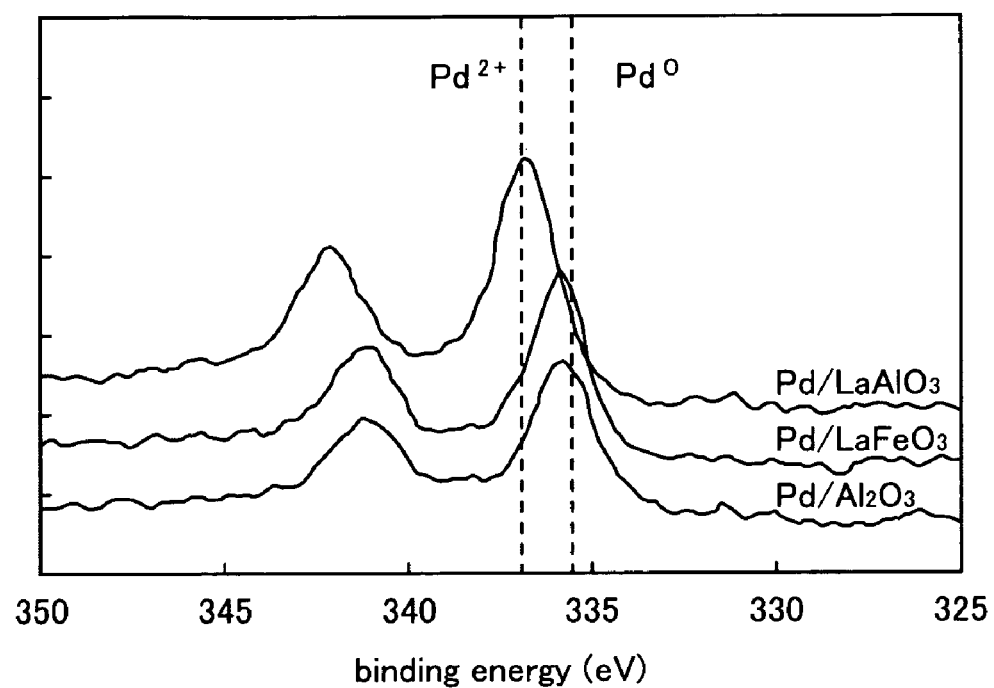
FIG. 3 is a graph showing 3d orbital vicinity of Pd examined regarding the Pd states in a PdO surface by XPS, in the Pd/LaAlO$_3$ which is an example of the present invention and in the Pd/LaFeO$_3$ and Pd/Al$_2$O$_3$ which is an example of the conventional technique.

Next, initial activities and activities after endurance running were estimated for the obtained catalyst powders. The estimation was performed by flowing model exhaust gas of a vehicle into catalysts under conditions in which A/F (air-fuel ratio) was substantially 14.6 and SV (stroke volume) was 5000 $h^{-1}$. Endurance running was performed for 20 hours at an endurance running temperature of 900° C. by using model exhaust gas in which A/F (air-fuel ratio) was substantially 14.6. These results are shown in FIG. 2 and FIG. 3. That is, the FIG. 2 shows a temperature at which CO, HC, and NO are reduced by 50% in a temperature increase test of catalysts before the endurance running. Moreover, the FIG. 3 shows a

COMPARATIVE EXAMPLE 1

$Pd/Al_2O_3$ was produced in a manner similar to that of the Practical Example 1, and various estimations for activity were performed. The endurance running temperature was set at 900° C. The result was also shown in Table 1 to 3.

COMPARATIVE EXAMPLE 2

$Pd/GdAlO_3$ was produced in a similar manner with the Practical Example 1. The crystal system of the $GdAlO_3$ is rhombic. Various estimates of activity were performed for this catalyst. The endurance running temperature was set at 900° C. The results are also shown in Tables 1 to 3.

COMPARATIVE EXAMPLE 3

$Pd/LaNiO_3$ was produced in a manner similar to that of the Practical Example 1. The $LaNiO_3$ is trigonal or rhombohedral. Various estimations for activity were performed for this catalyst. The endurance running temperature was set at 800° C. The results are also shown in Tables 1 to 3.

COMPARATIVE EXAMPLE 4

$Pd/LaMnO_3$ was produced in a manner similar to that of the Practical Example 1. The crystal system of the $LaMnO_3$ is rhombic. Various estimations for activity were performed for this catalyst. The endurance running temperature was set at 800° C. The results are also shown in Tables 1 to 3.

COMPARATIVE EXAMPLE 5

Pd/LaCoO$_3$ was produced in a manner similar to that of the Practical Example 1. The crystal system of the LaCoO$_3$ is rhombic. Various estimations for activity were performed for this catalyst. The endurance running temperature was set at 800° C. The results are also shown in Tables 1 to 3.

COMPARATIVE EXAMPLE 6

Pd/LaFeO$_3$ was produced in a manner similar to that of the Practical Example 1. The crystal system of the LaFeO$_3$ is rhombic. Various estimations for activity were performed for this catalyst. The endurance running temperature was set at 900° C. The results are also shown in Tables 1 to 3.

COMPARATIVE EXAMPLE 7

A given amount of lanthanum oxide and aluminum oxide were mixed by mortar and pestle, the mixed sample was moved to an aluminum crucible, the sample was heated for 10 hours at 1100° C. in a muffle kiln, and LaAlO$_3$ was obtained by solid-phase reaction. A precious metal was supported in a similar manner of the Practical Example 1 by using the LaAlO$_3$, whereby Pd/LaAlO$_3$ was obtained. Various estimations for activity were performed for this catalyst. The endurance running temperature was set at 900° C. The results are also shown in Tables 1 to 3.

According to the Tables 2 and 3, the purification catalysts for exhaust gas of the Practical Example 1 to 3 exhibit excellent temperatures at which CO, HC, and NO are reduced by 50% at any time before and after the endurance running. The reason for this is that the purification catalysts for exhaust gas of the Practical Examples 1 to 3 are made by supporting Pd on the LaAlO$_3$, PrAlO$_3$, or NdAlO$_3$, and these catalysts have a property of suppressing a reduction of PdO to Pd at high temperatures, whereby the high activity can be maintained in the running at low temperatures after a running at high temperatures in the catalysts. Moreover, the purification catalysts for exhaust gas of the Practical Examples 1 to 3 are trigonal or rhombohedral, and a B site in the perovskite-like composite oxide is Al in the catalysts of the Practical Examples 1 to 3, whereby dipole moment of the catalysts is large. Therefore, an electric fluctuation of PdO bounded on the LaAlO$_3$, PrAlO$_3$, or NdAlO$_3$ is larger than that of PdO which exists independently. Furthermore, in the purification catalysts for exhaust gas of the Practical Examples 1 to 3, LaAlO$_3$, PrAlO$_3$, or NdAlO$_3$ is produced, aqueous nitrate solution of element containing carboxylic acid is evaporated completely to obtain carboxylic acid complex polymer, whereby LaAlO$_3$, PrAlO$_3$, or NdAlO$_3$ is generated as a single phase, and a surface of the LaAlO$_3$, PrAlO$_3$, or NdAlO$_3$ supporting Pd take a form in which interaction with PdO is easy. Additionally, when the mixed solution is produced, malic acid can be used as mentioned above, and when citric acid and oxalic acid are similarly used, the same effect can be obtained.

On the other hand, the purification catalysts for exhaust gas of the Comparative Examples 1 to 7 cannot exhibit an excellent temperature at which CO, HC, and NO are reduced by 50% at any time before and after the endurance running. The reason is as follows. That is, in the catalyst of the Comparative Example 1, Al$_2$O$_3$ is a stable compound, and Al$_2$O$_3$ does not mutually affect precious metal supported, whereby activity of Pd does not improve. In the catalyst of the Comparative Example 2, the crystal system is rhombic, whereby electrons state among constituent atoms is not more unstable compared with the case of trigonal or rhombohedral. In the catalyst of the Comparative Example 3, even though the crystal system is trigonal or rhombohedral, Al does not exist in a B site in the perovskite-like composite oxide, whereby it is difficult to generate some of dipole moment in a crystal of perovskite-like composite oxides which generally has a high degree of probability of being an ionic bond. In the catalyst of the Comparative Examples 4 to 6, the crystal systems are rhombic, whereby electrons states among constituent atoms are not more unstable compared with the case of trigonal or rhombohedral. In the catalyst of the Comparative Example 7, carboxylic acid is not used when the catalyst is produce, whereby LaAlO$_3$ cannot be generated as a single phase. Therefore, sufficient surface-to-weight ratio cannot be obtained, and the surface of the crystal lattice cannot be used in an active state.

The purification catalyst for exhaust gas of the present invention can be applied to an internal combustion engine of vehicles in which nitrogen oxide (NOx), hydrocarbon (HC) and carbon monoxide (CO) in exhaust gas are required to be simultaneously and effectively purified and reduced recently.

The invention claimed is:

1. A production method for a purification catalyst for exhaust gas, wherein Pd and PdO are supported on an Al oxide and the Al oxide is LnAlO$_3$ (Ln: rare-earth metal) generated as a single phase and trigonal or rhombohedral, the method comprising:

preparing at least one kind of compound selected from a group of compounds of carboxylic acid having a hydroxyl group or a mercapto group and having a carbon number of 2 to 20, dicarboxylic acid having a carbon number of 2 or 3, and monocarboxylic acid having a carbon number of 1 to 20; and adding at least one compound selected from the group to an aqueous nitrate solution including Ln and Al component.

2. The production method for a purification catalyst for exhaust gas according to claim 1, the method comprising:

evaporating the aqueous nitrate solution completely to produce a carboxylic acid complex polymer; and heating the carboxylic acid complex polymer.

3. The production method for a purification catalyst for exhaust gas according to claim 2, wherein a heating temperature in the heating of the carboxylic acid complex polymer is not more than 1000° C.

* * * * *